United States Patent [19]
Nishio

[11] Patent Number: 5,307,669
[45] Date of Patent: May 3, 1994

[54] METHOD FOR TESTING A WATERPROOF CASING

[75] Inventor: Etsuro Nishio, Tokyo, Japan

[73] Assignee: Asahi Kogaku Kogyo Kabushiki Kaisha, Tokyo, Japan

[21] Appl. No.: 117,545

[22] Filed: Sep. 7, 1993

Related U.S. Application Data

[63] Continuation of Ser. No. 945,213, Sep. 15, 1992, abandoned.

[30] Foreign Application Priority Data

Sep. 17, 1991 [JP] Japan .................. 3-262636

[51] Int. Cl.$^5$ .................. G01M 3/26; G01M 3/32
[52] U.S. Cl. .................. 73/46; 73/40; 73/49.2
[58] Field of Search .......... 73/40, 49.2 R, 37, 45.5, 73/41.2, 49.3, 52, 46

[56] References Cited

U.S. PATENT DOCUMENTS

| | | | |
|---|---|---|---|
| 2,108,176 | 2/1938 | Newby | 73/40 |
| 2,679,747 | 6/1954 | Andrus | 73/40 |
| 3,355,932 | 12/1967 | Mulligan | 73/49.3 |
| 4,534,208 | 8/1985 | Macin et al. | 73/40 |

Primary Examiner—Hezron E. Williams
Assistant Examiner—Nashmiya N. Ashraf
Attorney, Agent, or Firm—Kane, Dalsimer, Sullivan, Kurucz, Levy, Eisele and Richard

[57] ABSTRACT

A method for testing a waterproof casing having a flexible watertight portion having a flexible waterproofing portion, which is compressed to establish a water tight seal, and a stationary watertight portion, in which the watertightness is established by an adhesive, using a test casing to serve as the adjoining element, wherein the flexible waterproofing portion and the test casing together define a closed chamber, and wherein an air pressure change can be effected in the chamber through the test casing. The method includes the steps of establishing a first air pressure in the closed chamber, less than atmospheric pressure, which causes elastic deformation of the flexible waterproofing portion, and subsequently detecting a change in internal air pressure of the closed chamber. The method further includes the steps of establishing a second air pressure in the closed chamber, less than atmospheric pressure, but greater than the first air pressure, which causes a smaller elastic deformation of the flexible waterproofing portion than the first air pressure and, subsequently detecting a change in internal air pressure of the closed chamber.

6 Claims, 4 Drawing Sheets

METHOD FOR TESTING A WATERPROOF CASING

This is a continuation of copending application Ser. No. 07/945,213 filed on Sep. 15, 1992, now abandoned.

BACKGROUND OF THE INVENTION

1. Field of the Invention

The present invention relates to a method for testing a waterproof casing. Particularly, it relates to a method for testing a waterproof casing element having a flexible waterproofing portion which is compressed against an adjoining element to establish a water tight seal and a stationary watertight portion in which the water tight seal is established by an adhesive.

2 Description of Related Art

To test the water tightness of a waterproof casing element, it is known to immerse the waterproof casing to be tested in a water, so that if there is a portion which is not watertight, air bubbles will appear at the defective portion. In the known method, however, if the camera to be tested is defective in water tightness, internal elements of the camera can be damaged by water which has penetrated through the camera.

To solve the problem mentioned above, a known testing method is used in which internal air pressure of a watertight casing element is reduced, so that the watertightness can be detected in accordance with a change in the internal air pressure. If this testing method is applied to a waterproof casing element having a flexible waterproofing portion, which is compressed against an adjoining element to establish a water tight seal, and a stationary watertight portion, in which the water tightness is established by an adhesive, it is impossible to distinguish between the defective portions. Namely, whether the flexible waterproofing portion is defective or the stationary watertight portion (i.e., the adhesive) is defective cannot be discriminated.

Namely, in the watertight casing of the type mentioned above, upon testing, the internal air pressure thereof is reduced, causing the flexible waterproofing portion to be elastically deformed, thereby establishing an airtight (watertight) connection. If the flexible waterproofing portion has a tiny defective portion (e.g., pin hole), the latter may temporarily disappear when the elastic deformation of flexible waterproofing portion takes place. Namely, there is no air or water leakage through the tiny defective portion which has temporarily disappeared due to the elastic deformation of the flexible waterproofing portion. Accordingly, a defective portion can not be found.

Conversely, when the air pressure reduction is too small to cause a sufficient elastic deformation of the flexible waterproofing portion, if leakage (indicated by a pressure change) takes place, it is impossible to discriminate whether the leakage occurs in the flexible watertight portion or the stationary watertight portion.

SUMMARY OF THE INVENTION

The primary object of the present invention is to eliminate the above mentioned drawbacks of the prior art by providing a method for testing a waterproof casing having a flexible watertight portion which is compressed against an adjoining element to establish water tightness and a stationary watertight portion in which water tightness is established by an adhesive, wherein it is possible to easily discriminate between leakage (pressure change) in the flexible watertight portion and the stationary watertight portion.

To achieve the object mentioned above, according to the present invention, there is provided a method for testing a waterproof casing having a flexible waterproofing portion, which is compressed against an adjoining element to establish a water tightness, and a stationary watertight portion in which the water tightness is established by an adhesive, using a test casing to serve as the adjoining element, wherein the flexible waterproofing portion and the test casing together define a closed chamber, and wherein an air pressure change can be effected in the chamber through the test casing. The method comprises the steps of establishing a first air pressure in the closed chamber, less than atmospheric pressure, which causes elastic deformation of the flexible waterproofing portion, and subsequently detecting a change in internal air pressure of the closed chamber. The method further includes a second step of establishing a second air pressure in the closed chamber, less than atmospheric pressure, but greater than the first air pressure, which causes a smaller elastic deformation of the flexible waterproofing portion than the first air pressure, and subsequently detecting a change in internal air pressure of the closed chamber.

According to another aspect of the present invention, a method for testing a waterproof casing, comprises preparing a test casing with which the flexible waterproofing portion is to be brought into elastic contact to define a closed chamber, reducing the internal air pressure of the closed chamber to a first air pressure, at which pressure even if the flexible waterproofing member has a defective portion the flexible waterproofing member is elastically deformed to absorb the defect, and detecting a change of the internal air pressure of the closed chamber, so that a defective portion, other than the defective portion in the flexible waterproofing portion can be detected in accordance with the change in internal pressure.

The testing method further comprises, reducing the internal air pressure of the closed chamber to a second air pressure which is higher than the first negative air pressure value, but still lower than atmospheric pressure, at which the flexible waterproofing member is elastically deformed, so that the defective portion of the waterproof casing appears, and detecting a change of the second internal air pressure of the closed chamber, so that the defective flexible waterproofing member can be detected in accordance with the change of the second internal air pressure.

The present disclosure relates to subject matter contained in Japanese patent application No. 3-262636 (filed on Sep. 17, 1991) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 1A:
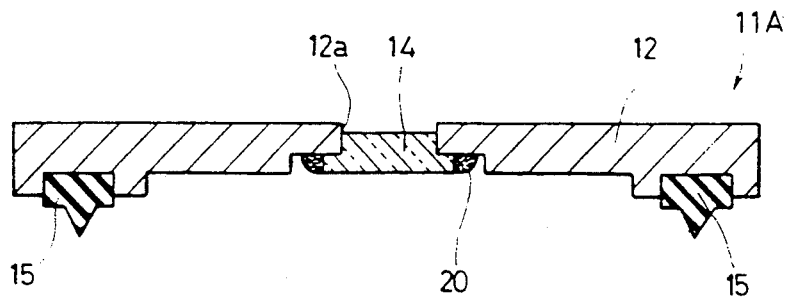
FIG. 1A is a sectional view of a waterproof casing, having no defective portion, to be tested by a testing method according to the present invention.

FIGS. 1A through 1D show examples of a waterproof casing to be tested according to the present invention. The waterproof casing 11 (11A, 11B, 11C, or 11D) to be tested has a casing body 12 which is provided, on the lower peripheral surface thereof, with a closed flexible waterproofing member 15 made of soft rubber or a similar material which can be elastically deformed. The casing body 12 is also provided with a center opening 12a in which a transparent window member 14 is mounted. The transparent window member 14 is adhered to the center opening 12a by an adhesive 20. In the illustrated embodiment, the flexible waterproofing member 15 and the adhesive 20 constitute a flexible watertight portion and a stationary watertight portion, respectively.

The waterproof casing 11A, shown in FIG. 1A, has no defective portion in either the flexible waterproofing seal member 15 or the adhesive 20. The waterproof casing 11B, shown in FIG. 1B, has a defective watertight portion 15a in the flexible waterproofing member 15. The waterproof casing 11C, shown in FIG. 1C, has a defective watertight portion 20d (i.e., in the adhesive 20). The waterproof casing 11D, shown in FIG. 1D, has defective watertight portions 15a and 20d in both the flexible waterproofing member 15 and the adhesive 20.

To examine the water tightness of the waterproof casing 11, the latter is compressed against an air pressure reduction casing 13 to define a closed chamber. The air pressure reduction casing 13 has a seal surface 13b on which the flexible waterproofing member 15 is compressed, and an opening 16 with an engaging projection 13a in which a testing adaptor 17 is fitted through an O-ring 18. The testing adaptor 17 has a suction pipe 19 which extends therethrough to connect the internal space of the air pressure reduction casing to an air pressure reduction device, such as a vacuum pump (not shown).

Upon testing the water tightness of the casing 11, the internal air pressure of the air pressure reduction casing 13 is reduced to two different negative air pressure values, P1 and P2 (P1<P2), by withdrawing air through the suction pipe 19.

Figure 1B:
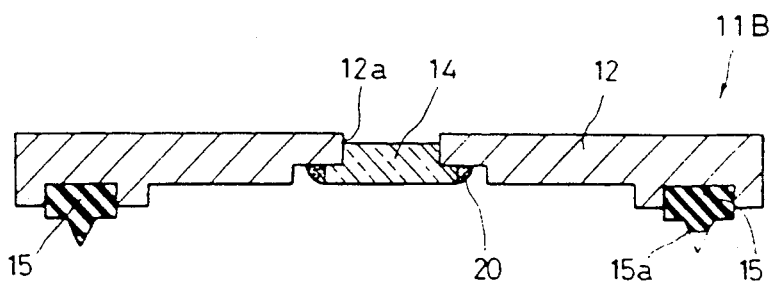
FIGS. 1B, 1C, and 1D are sectional views showing three examples of defective waterproof casings.
Figure 1C:
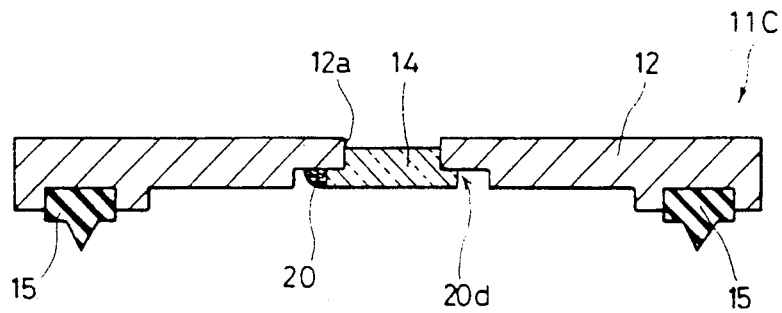
Figure 1D:
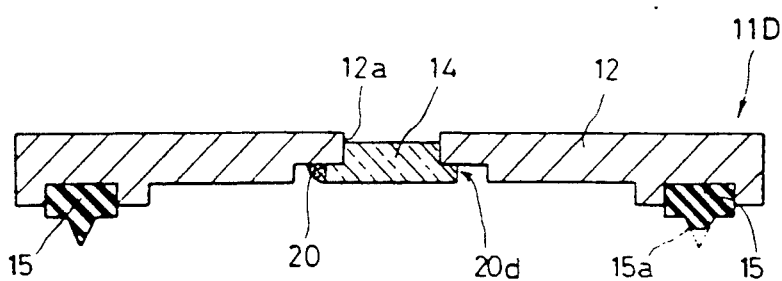
Figure 3:
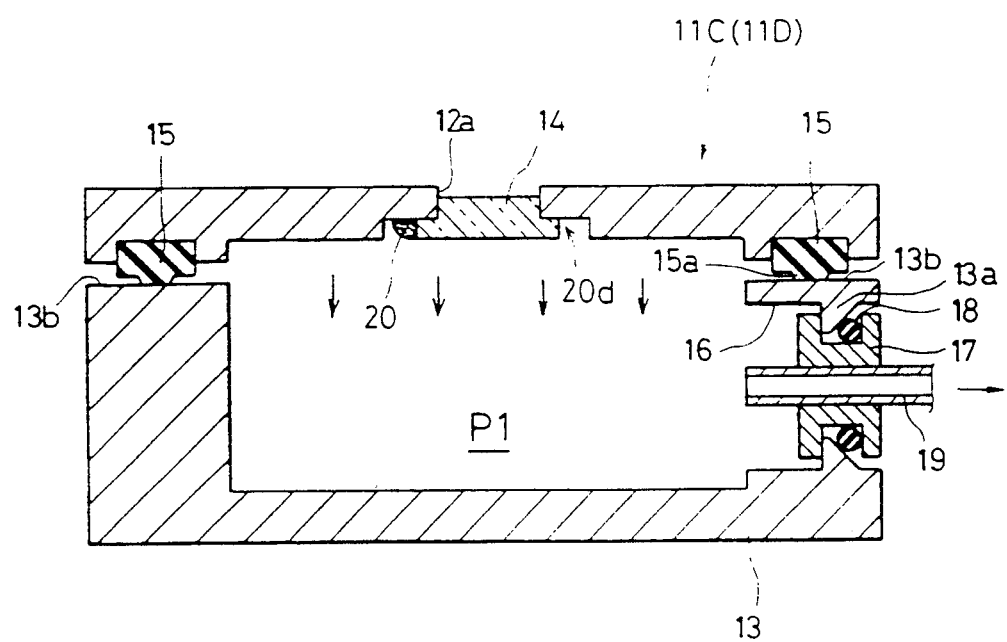
FIG. 3 is a sectional view illustrating a method for testing a waterproof casing as shown in FIGS. 1C or 1D; and, FIG. 4 is a sectional view illustrating a method for testing a waterproof casing as shown in FIGS. 1A or 1B.
Figure 4:
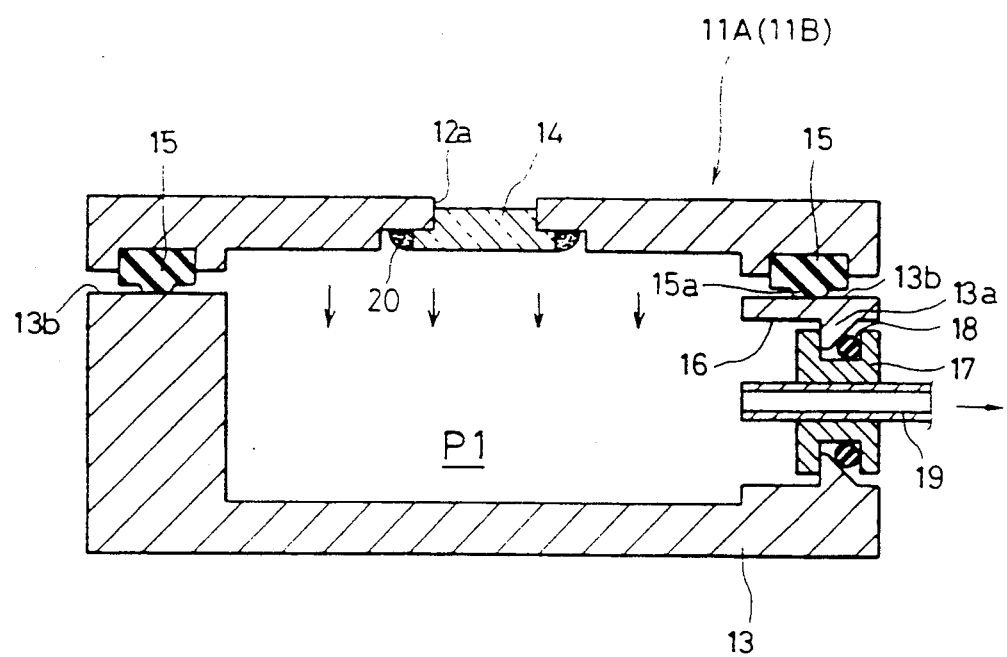

Namely, in FIGS. 3 and 4, in which the lower pressure P1 is established in the air pressure reduction casing 13, a large elastic deformation of the flexible waterproofing member 15 occurs due to the extremely low air pressure. Accordingly, if a defective portion 15a exists in the elastic seal member 15, the defective portion 15a will be undetectable due to the extreme elastic deformation. Consequently, a defect which is to be found in a waterproof casing by the first examination, as shown in FIG. 3, will be a waterproof casing having a defect 20d of waterproof casing 11C or 11D, as shown in FIG. 1C or FIG. 1D, respectively. The waterproof casing 11B, shown in FIG. 1B, has a defective portion 15a in the flexible waterproofing member 15, as mentioned above. Nevertheless, the waterproof casing 11B is determined to be a good product (FIG. 4) upon the first examination. Thus, the waterproof casings 11A and 11B are distinguished from the defective waterproof casings 11C and 11D by the first examination, as shown in FIG. 3.

Figure 2:
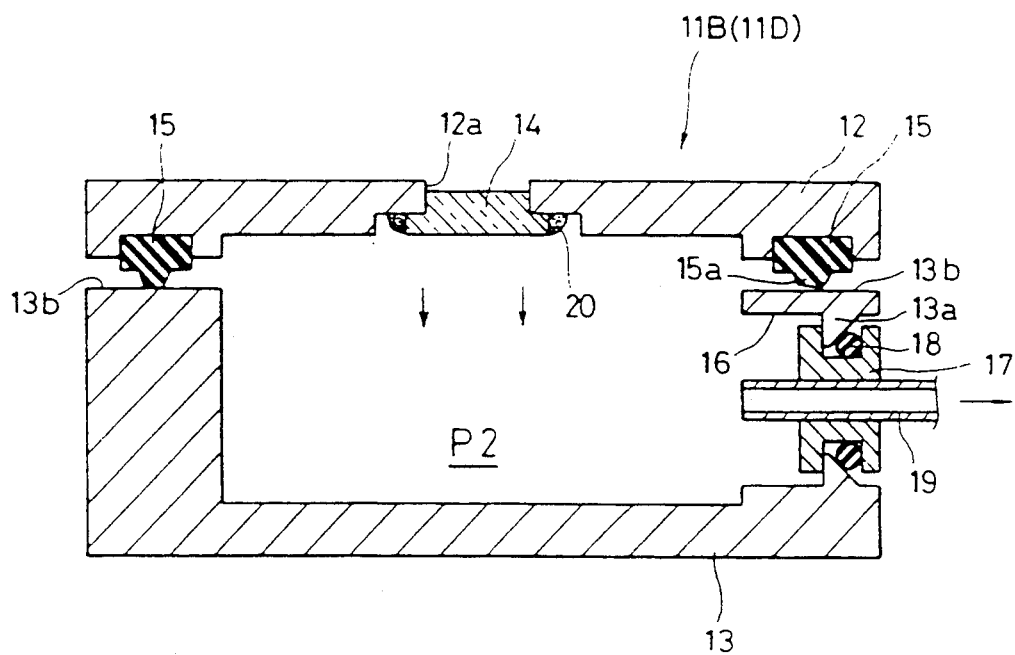
FIG. 2 is a sectional view illustrating a method for testing a waterproof casing as shown in FIG. 1B.

Waterproof casings 11A and 11B, which have been determined to be good in the first examination, are then subject to a second examination shown in FIG. 2. In the second examination, an air pressure P2, slightly higher than the air pressure P1, is established in the air pressure reduction casing 13. It is assumed that the degree of elastic deformation of the elastic seal 15 is decreased under the air pressure P2, in comparison with the lower air pressure P1 shown in FIG. 3. Accordingly, the defective portion 15a of the flexible water proofing member 15 appears, as shown in FIG. 2.

In the second examination (second step), shown in FIG. 2, no change, i.e., no increase in the internal air pressure P2, occurs if the product has no defective portion. In other words, it is determined that the waterproof casing is the waterproof casing 11A, shown in FIG. 1A. On the contrary, in the casing of defective waterproof casing 11B, as shown in FIG. 1B, there is an increase of the internal air pressure P2, due to the existence of the defective portion 15a. Specifically, after the pressure has been reduced to P2, external air will be introduced into the waterproof casing 11B through the defective area. Consequently, the defective water proof casing 11B can be distinguished by detecting an increase in the air pressure. Thus, only the waterproof casing 11A, having no defective portion in either the flexible waterproofing member 15 or the adhesive 20, as shown in FIG. 1A, is determined to be watertight after the second examination.

The defective waterproof casing 11B can be reexamined after the flexible waterproofing member 15 is exchanged.

The defective waterproof casing 11C or 11D, which are determined to be defective in the first examination (first step), can be reexamined after the flexible waterproofing member 15 and/or the adhesive 20 is exchanged or modified.

As can be seen from the above discussion, according to the present invention, upon testing the waterproof casing having a flexible watertight portion which is compressed against an adjoining element to establish a water tightness and a stationary watertight portion in which the water tightness is established by an adhesive, two different internal air pressures are successively established in the waterproof casing to be tested. Accordingly, the defective portions of the waterproof casing in the flexible waterproofing member and the adhesive can be easily detected and distinguishable from one another.

I claim:

1. A method for testing a waterproof casing having a flexible waterproofing member, comprising the steps of:
   bringing said flexible waterproofing member into contact with an air pressure reduction casing to define a closed chamber;
   reducing the internal air pressure of the closed chamber to a first negative air pressure sufficient to deform and bring the flexible waterproofing member into a sealing contact with the air pressure reducing casing regardless of any defect in said flexible waterproofing member; and,
   seeking to detect a change in internal air pressure of the closed chamber, whereby a defective portion of said waterproof casing other than a defect in said flexible waterproofing member can be detected in accordance with the change of internal air pressure.

2. A testing method according to claim 1, further comprising the steps of:
reducing the internal air pressure of the closed chamber to a second negative air pressure value, higher than the first negative air pressure value and insufficient to deform and bring said flexible waterproofing member to sealingly contact said air pressure reduction casing in the event of a defect therein; and,
seeking to detect a change in internal air pressure of the closed chamber, so that a defect in the flexible waterproofing member can be detected in accordance with the change of the internal air pressure.

3. A method for testing a waterproof case element having (1) a flexible waterproofing portion, which, in use, is compressed against an adjoining element to establish a watertight seal, and (2) a permanent watertight portion, in which a watertight seal is established by an adhesive, said method employing a test casing to serve as the adjoining element to the flexible waterproofing portion, wherein the waterproof case element and the test casing together define a closed chamber within which an air pressure change can be effected, said method comprising the steps of:
pressurizing the closed chamber to a first negative air pressure;
seeking to detect a change in air pressure within the closed chamber after said first negative air pressure is established within said closed chamber;
pressurizing the closed chamber to a second negative air pressure if no air pressure change is detected within said closed chamber after said closed chamber is pressurized to said first negative air pressure, wherein said second negative air pressure differs from said first negative air pressure.
seeking to detect a change in air pressure within the closed chamber after said second negative air pressure is established within said closed chamber; and,
determining that said waterproof case element is defective and the nature of the defect if and when a change in pressure is detected within said closed chamber after at least one of said first and second negative air pressures is established within said closed chamber.

4. A testing method in accordance with claim 3 wherein said first negative air pressure in the closed chamber is sufficient to draw the flexible waterproofing portion into a sealing engagement with said test casing to establish a watertight connection with the test casing and comprising the further step of determining that the permanent watertight portion of the waterproof element is defective if a pressure change is detected after pressurizing said closed chamber to said first negative air pressure.

5. A testing method according to claim 4 wherein said second negative air pressure is less negative than said first negative air pressure and not sufficient to draw the flexible waterproofing portion into a sealing engagement with said test casing wherein when no change of the internal air pressure of the closed chamber is detected after pressurizing to said first negative air pressure the closed chamber is subject to the second negative air pressure and determining that the flexible waterproofing portion of the waterproof casing element is defective if a change in internal pressure of the closed chamber is detected.

6. A testing method according to claim 5, wherein when no change in internal air pressure of the closed chamber is detected after pressurizing to said first and second negative pressures the casing element is determined to be watertight.

* * * * *